United States Patent [19]

Flaig et al.

[11] Patent Number: 5,346,037

[45] Date of Patent: Sep. 13, 1994

[54] PACKING NUT AND ROD GUIDE FOR PISTON PAINT PUMPS

[75] Inventors: Thomas H. Flaig, Robbinsdale; Norman A. Cyphers, Rogers, both of Minn.

[73] Assignee: Wagner Spray Tech Corporation, Minneapolis, Minn.

[21] Appl. No.: 117,256

[22] Filed: Sep. 3, 1993

[51] Int. Cl.5 .......................... F16N 1/00; F16J 15/18
[52] U.S. Cl. ........................ 184/24; 417/554; 277/110; 92/168
[58] Field of Search ............... 417/523, 524, 545, 547, 417/554; 92/168; 184/24; 277/105, 110, 124

[56] References Cited

U.S. PATENT DOCUMENTS

| 950,268 | 2/1910 | Weston et al. | 184/24 |
|---|---|---|---|
| 1,630,444 | 5/1927 | McLaine et al. | 184/24 |
| 2,002,012 | 5/1935 | Howard | 184/24 |
| 2,257,011 | 9/1941 | Hillier | 184/24 |
| 2,292,543 | 8/1942 | Patterson | 277/110 |
| 2,985,140 | 5/1961 | Fagge | 92/168 |
| 3,184,124 | 5/1965 | Beck | 417/547 |
| 4,568,249 | 2/1986 | Todd | 92/168 |

FOREIGN PATENT DOCUMENTS

| 631587 | 8/1932 | Fed. Rep. of Germany | 277/124 |
|---|---|---|---|
| 531 | of 1861 | United Kingdom | 184/24 |

Primary Examiner—Richard A. Bertsch
Assistant Examiner—Roland G. McAndrews, Jr.
Attorney, Agent, or Firm—Faegre & Benson

[57] ABSTRACT

A combined packing nut and rod guide for piston paint pumps has a body with a central bore therethrough and at least one relief extending axially along the bore providing a lubricating passageway and paint leakage path. An annular reservoir is formed at an interior end of the nut body for lubricating fluid. The nut body has axial and radial surfaces to axially and radially position the combined packing nut and rod guide in the pump housing to locate and maintain the position of the piston rod with respect to the housing.

15 Claims, 3 Drawing Sheets

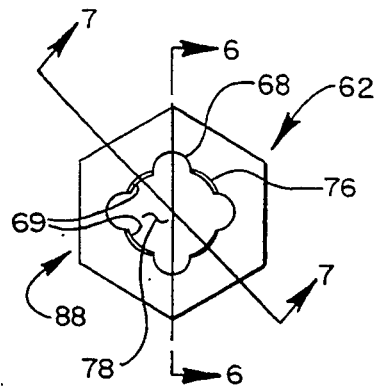
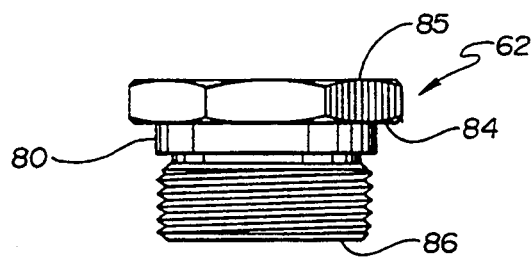
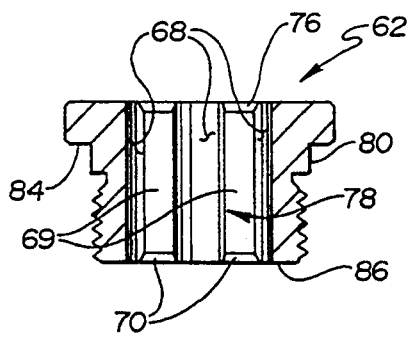
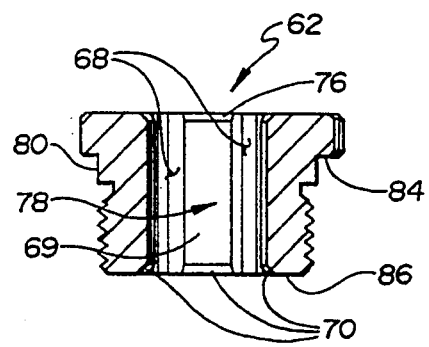
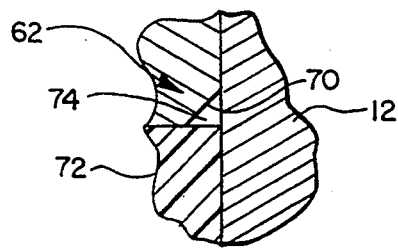

PACKING NUT AND ROD GUIDE FOR PISTON PAINT PUMPS

BACKGROUND OF THE INVENTION

This invention relates to piston paint pumps, more particularly, to those pump assemblies having a drag link subassembly between a rotating eccentric and a linearly reciprocating piston rod.

BRIEF DESCRIPTION OF THE DRAWINGS

FIG. 4 is an end view of the packing nut and rod guide of the present invention.

FIG. 5 is a side view of the packing nut and rod guide of FIG. 4.

FIG. 6 is a section view taken along line 6—6 of FIG. 4.

FIG. 7 is a section view taken along line 7—7 of FIG. 4.

FIG. 8 is a detail view of a portion of FIG. 3 showing certain aspects of the invention.

DETAILED DESCRIPTION OF THE INVENTION

Figure 3:
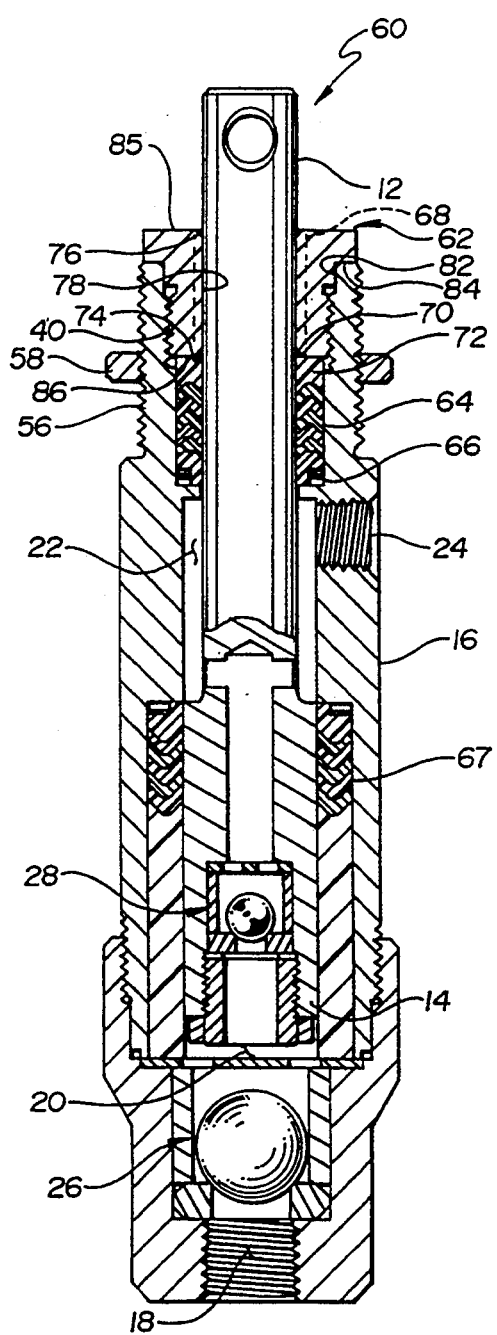
FIG. 3 is a section view of a piston pump assembly utilizing the packing nut and rod guide of the present invention.
Figure 1:
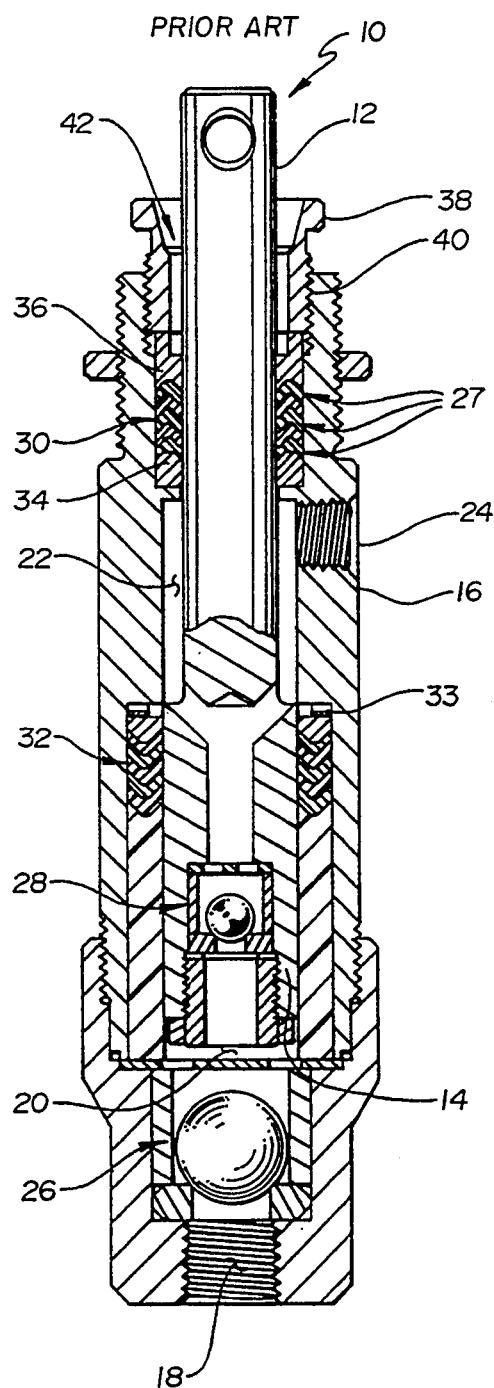
FIG. 1 is a section view of a prior art piston pump assembly having a conventional packing nut.

Referring now to the Figures, and more particularly to FIG. 1, a prior art piston pump assembly 10 may be seen. Assembly 10 has a piston rod 12 connected to and formed integrally with a piston 14 carried in a pump housing 16. When piston rod 12 and piston 14 are drawn upward or out of housing 16, paint is drawn in the inlet 18 to an inlet chamber 20 and any paint in an outlet chamber 22 is discharged via housing outlet 24. An inlet check valve 26 is open and an outlet check valve 28 is closed during the preceding operation. Rod 12 and piston 14 are then reciprocated and pushed back into housing 16. During this time, the inlet check valve 26 is closed and the outlet check valve 28 is open causing paint within the pump to move from the inlet chamber 20 to the outlet chamber 22. A set of V-ring packings 30 seals piston rod 12 to housing 16. A second set of V-ring packings 32 is axially preloaded by a wave spring 33 to seal piston 14 to housing 16 thereby separating chambers 20 and 22. The V-ring packing set 30 is preferably compressed between end pieces 34, 36 via a packing nut 38. It is to be understood that packing nut 38 and housing 16 are each threaded and engaged together, retaining the packing nut 38 to housing 16 and allowing axial compression of end piece 36 against the V-ring packing set 30. An enlarged bore 42 provides clearance between the internal diameter of nut 38 and the piston rod 12. In this design any side loads on rod 12 must be taken up by end pieces 34, 36 and the packing set 30.

Figure 2:
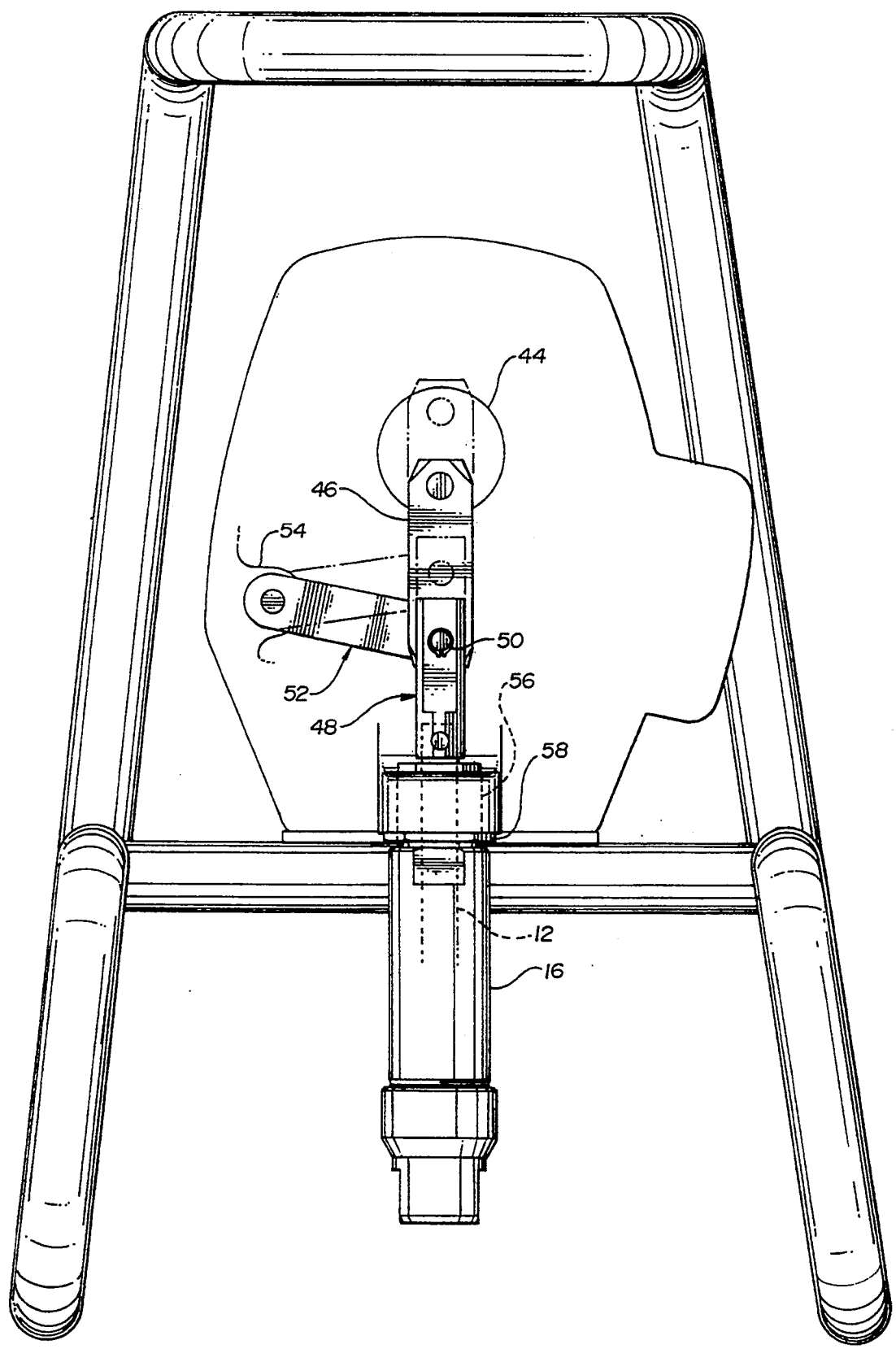
FIG. 2 is an end view partially in section of a piston pump having an eccentric drive and drag link subassembly.

Referring now to FIG. 2, the piston pump assembly of the prior art and that of the present invention are each intended to be driven by an eccentric 44 driving a connecting rod 46 which is shown in solid lines in a bottom dead center position and in phantom in a top dead center position. Connecting rod 46 is coupled to piston rod 12 via the yoke 48. It is to be understood that connecting rod 46 and yoke 48 are secured together by a yoke pin 50. To maintain alignment of yoke 48 and piston rod 12, a drag link 52 is connected between yoke pin 50 and stationary pump frame 54. Link 52 is shown in a bottom dead center position in solid lines and in a top dead center position in phantom in FIG. 2. It is to be further understood that pump housing 16 is secured to the pump frame 54 via a set of threads 56 and a lock nut 58.

As drag link 52 reciprocates, it will be apparent that yoke pin 50 will travel in an arc and not exactly in line with the axis of the cylindrical piston rod 12 as it reciprocates in and out of the cylindrical housing 16. Such arcuate movement, transmitted via yoke 48, will impose a side load on piston rod 12.

Referring now to FIGS. 3-8, various details of the present invention may be seen. It is to be understood that the environment shown in FIG. 2 is suitable for the prior art assembly 10 and, alternatively, for the assembly 60 (shown in FIG. 3) which utilizes the packing nut and rod guide of the present invention, shown in more detail in FIGS. 4-8. Assembly 60 is similar or identical in most respects to assembly 10, but differs from it in that it has a novel packing nut and rod guide 62 supporting piston rod 12 against side loads. Certain other features of the body of nut 62 also differ from that of packing nut 38 of the prior art. Assembly 60 also differs in that the rod V-ring packing set 64 is compressed by nut 62 against a wave spring 66 providing a predetermined and constant axial load on V-ring packing set 64. A similar structure and operation is provided for piston V-ring packing set 67.

As may be seen by reference to FIGS. 4-7, nut body 62 preferably has a plurality of reliefs 68 passing entirely axially through nut body 62 from a first or top end 85 to a second or bottom end 86. A plurality of lands 69 are interposed between the reliefs 68 and lands 69 collectively form the surface of bore 78. It is to be understood that lands 69 describe a generally cylindrical surface interrupted by reliefs 68. Lands 69 provide a bearing surface for side loads on piston rod 12, while each relief 68 provides a lubricating passageway for piston rod 12. In addition, (and as may be seen in detail in FIG. 8) nut 62 preferably has a lower chamfer 70 which, together with end piece 72 and piston rod 12 form an annular chamber 74 for lubricating oil to circumferentially surround piston rod 12. Reliefs 68 and chamber 74 form a reservoir for lubricating oil for piston rod 12. An upper chamfer 76 avoids the risk of burrs or a "rolled" edge along the upper edge of central bore 78 in nut body 62. Nut body 62 also has a diametral piloting surface 80 on which nut body 62 and piston rod 12 are piloted for maintaining concentricity with housing 16. A mating piloting surface 82 is formed in housing 16. Nut body 62 further includes an axial stop surface 84 to positively locate the position of the bottom or second end 86 of nut body 62 with respect to pump housing 16 to enable applying the predetermined and repeatable amount of axial load to the rod packing set 64 because of the consequent predetermined deflection of wave spring 66.

Nut 62 also has at least two diametrically opposed wrench flats, and preferably a hexagonal shaped head 88 located at the first end of the nut body 62 for removably securing the nut body 62 to the pump housing 16.

It is to be understood that reliefs 68 also provide a path for paint leakage at such time as the rod packing set 64 fails to seal piston rod 12 against housing 16. It has been found that if a closely interfitting cylindrical bore is provided in nut 62 without one or more reliefs 68, that paint leaking along the rod 12 can build up between the rod and the packing nut and cause substantially increased friction and loading of the prime mover driving the pump with the consequent adverse consequences to operation. Reliefs 68 thus serve the dual purpose of providing a lubrication path and reservoir for piston rod 12 while also providing for a "designed in" leakage path if the rod V-ring packing set 64 is not serviced before it fails. Furthermore, in an emergency, pump apparatus 60 may be operated while leaking (possibly with reduced pressure) without the paint coating the entire circumference of rod 12 with the consequent increased friction that would be present if reliefs 68 were absent. It is to be further understood that lands 69 may, in certain instances serve as "chip breakers" or scrapers to clear a path axially along rod 12 in the event of continued leakage and buildup of paint on rod 12. The nut body 62 is preferably formed of a brass material, more particularly, type SAE CA360 free cutting brass.

The invention is not to be taken as limited to all of the details thereof as modifications and variations thereof may be made without departing from the spirit or scope of the invention.

What is claimed is:

1. A combined packing nut and rod guide for reciprocating paint pumps of the type having a piston rod end extending axially exteriorly of and sealed to a pump housing, the combined packing nut and guide comprising a nut body removably secured to the pump housing and having:
   a. a first end extending exteriorly of the pump housing;
   b. a second end extending into the pump housing and axially loading a rod packing set;
   c. a central bore extending axially through the nut body and sized to closely interfit with the piston rod for guiding the rod in the housing; and
   d. at least one relief extending completely axially through the nut body adjacent the bore for providing a lubricating passageway along the piston rod.

2. The combined packing nut and rod guide of claim 1 further comprising:
   e. a plurality of lands along the central bore for supporting the piston rod against side loads.

3. The combined packing nut and rod guide of claim 1 further comprising:
   e. a diametral piloting surface on the nut body sized to closely interfit with a bore in the pump housing to positively radially locate the rod with respect to the housing.

4. The combined packing nut and rod guide of claim 1 further comprising:
   e. an axial stop surface located on the nut body and positioned a predetermined distance from the second end thereof to positively axially locate the position of the second end with respect to the pump housing to enable applying a predetermined amount of the axial load to the rod packing set.

5. The combined packing nut and rod guide of claim 1 further comprising:
   e. at least two diametrically opposed wrench flats located at the first end of the nut body for removably securing the nut body to the pump housing.

6. The combined packing nut and rod guide of claim 1 further comprising:
   e. a chamfer on the central bore at the first end of the nut body.

7. The combined packing nut and rod guide of claim 1 wherein the nut body is formed of brass material.

8. The combined packing nut and rod guide of claim 7 wherein the brass material of the nut body is type SAE CA360 free cutting brass.

9. The combined packing nut and rod guide of claim 1 further comprising:
   e. a lubrication reservoir connected to the relief and formed as an annular enlargement of the central bore.

10. The combined packing nut and rod guide of claim 9 wherein the lubrication reservoir is located at the second end of the nut body.

11. The combined packing nut and rod guide of claim 10 wherein the lubrication reservoir is formed by a chamfer on the central bore at the second end of the nut body.

12. An assembly for increasing the side load capability while sealing reciprocating piston paint pumps against leakage, the assembly comprising:
   a. a pump housing;
   b. a piston rod located in the pump housing for reciprocating pumping motion with respect thereto;
   c. a rod packing set located between the piston rod and the pump housing for sealing the rod to the pump housing while permitting the reciprocating motion of the rod; and
   d. a nut body removably secured to the pump housing and having:
      i. a first end extending exteriorly of the pump housing,
      ii. a second end extending into the pump housing and axially loading the rod packing set,
      iii. a central bore extending axially through the nut body and sized to closely interfit with the piston rod for guiding the rod in the housing, and
      iv. at least one relief extending completely axially through the nut body adjacent the bore for providing a lubricating passageway for the piston rod such that the piston rod is reinforced against side loads by the packing nut and the relief provides a path for paint leakage at such time as the rod packing set fails to seal.

13. The assembly of claim 12 wherein the piston rod and pump housing are each generally cylindrical and the packing nut maintains the piston rod substantially concentric to the pump housing when the piston rod is subjected to side loading.

14. The assembly of claim 12 wherein the piston rod projects generally vertically upward from the pump housing such that a lubricating liquid in the relief of the packing nut is retained by gravity.

15. The assembly of claim 12 further comprising:
   e. a drag link subassembly having:
      i. a yoke connected to the piston rod,
      ii. a connecting rod driven by an eccentric and connected to the yoke via a yoke pin, and
      iii. a drag link connected between the yoke pin and a stationary pump frame
   such that the packing nut guides the piston rod in the pump housing while bearing the side load imposed by the drag link moving in a generally arcuate reciprocating path as the eccentric drives the piston rod via the drag link subassembly.

* * * * *